US010623209B2

(12) United States Patent
Cheng et al.

(10) Patent No.: US 10,623,209 B2
(45) Date of Patent: Apr. 14, 2020

(54) SYSTEMS AND METHODS FOR HIGH-RELIABILITY ULTRA-RELIABLE LOW LATENCY COMMUNICATION TRANSMISSIONS

(71) Applicant: FG Innovation Company Limited, Tuen Mun (CN)

(72) Inventors: Yu-Hsin Cheng, Hsinchu (TW); Chie-Ming Chou, Hsinchu (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 16/034,795

(22) Filed: Jul. 13, 2018

(65) Prior Publication Data
US 2019/0020506 A1    Jan. 17, 2019

Related U.S. Application Data

(60) Provisional application No. 62/532,582, filed on Jul. 14, 2017.

(51) Int. Cl.
*H04W 4/00*    (2018.01)
*H04L 25/02*   (2006.01)
*H04L 5/00*    (2006.01)

(52) U.S. Cl.
CPC ........ *H04L 25/0232* (2013.01); *H04L 5/0053* (2013.01)

(58) Field of Classification Search
None
See application file for complete search history.

(56) References Cited

U.S. PATENT DOCUMENTS

| 2015/0103715 | A1  | 4/2015  | Chen et al.      |              |
|--------------|-----|---------|------------------|--------------|
| 2015/0181576 | A1* | 6/2015  | Papasakellariou  | H04L 5/0053  |
|              |     |         |                  | 370/329      |
| 2016/0127918 | A1* | 5/2016  | Yi               | H04W 84/047  |
|              |     |         |                  | 370/329      |
| 2018/0279289 | A1* | 9/2018  | Islam            | H04W 72/048  |
| 2018/0294911 | A1* | 10/2018 | Sun              | H04L 5/0053  |
| 2019/0200345 | A1* | 6/2019  | Zhang            | H04W 72/1289 |

FOREIGN PATENT DOCUMENTS

WO    2014067488 A    5/2014

* cited by examiner

*Primary Examiner* — Clemence S Han
(74) *Attorney, Agent, or Firm* — ScienBiziP, P.C.

(57) ABSTRACT

A method for wireless communication involving high-reliability ultra-reliable low latency communication (URLLC) control and data channel transmissions is disclosed. The method includes receiving, by a user equipment (UE), first downlink control information (DCI) in a first control resource set (CORESET), the first DCI providing scheduling information for transmission of first data over a first physical downlink shared channel (PDSCH), receiving, by the UE, second DCI in a second CORESET, the second DCI providing scheduling information for transmission of second data over a second PDSCH. The method also includes receiving, by the UE, the first data over the first PDSCH, and receiving, by the UE, the second data over the second PDSCH, where the first data and the second data are repetition data.

26 Claims, 10 Drawing Sheets

CORESET Configuration

- CORESET 1
  - Aggregation level : 8
  - Number of BD candidate : 1
  - Resource allocation
    - Start RB# : 18
    - End RB# : 41
  - Coding rate : $\frac{1}{6}$
  - Decoding order : 1

- CORESET 2
  - Aggregation level : 2
  - Number of BD candidate : 2
  - Resource allocation
    - Start RB# : 0
    - End RB# : 11
  - Coding rate : $\frac{2}{3}$
  - Decoding order : 2

- CORESET 3
  - Aggregation level : 1
  - Number of BD candidate : 2
  - Resource allocation
    - Start RB# : 54
    - End RB# : 59
  - Coding rate : $\frac{3}{4}$
  - Decoding order : 3

FIG. 9A

DCI from control region 1
- Carrier indicator
- Resource allocation header
- Resource allocation information
  - Start RB# : 12
  - RB length : 6
- MCS index : 20
- HARQ number : 0
- New data indicator : 0
- TPC for PUCCH
- DAI

FIG. 9B

DCI from control region 2
- Carrier indicator
- Resource allocation header
- Resource allocation information
  - Start RB# : 30
  - RB length : 12
- MCS index : 10
- HARQ number : 0
- New data indicator : 0
- TPC for PUCCH
- DAI

FIG. 9C

DCI from control region 3
- Carrier indicator
- Resource allocation header
- Resource allocation information
  - Start RB# : 48
  - RB length : 12
- MCS index : 18
- HARQ number : 0
- New data indicator : 1
- TPC for PUCCH
- DAI

SYSTEMS AND METHODS FOR HIGH-RELIABILITY ULTRA-RELIABLE LOW LATENCY COMMUNICATION TRANSMISSIONS

CROSS-REFERENCE TO RELATED APPLICATION(S)

The present application claims the benefit of and priority to a provisional U.S. Patent Application Ser. No. 62/532,582 filed Jul. 14, 2017, entitled "SYSTEMS AND METHODS FOR HIGH-RELIABILITY URLLC TRANSMISSIONS,". The disclosure is hereby incorporated fully by reference into the present application.

FIELD

The present disclosure generally relates to wireless communication, and more particularly, to high-reliability ultra-reliable low latency communication (URLLC) control and data channel transmissions.

BACKGROUND

URLLC is one of a diversity of use cases envisaged under the next generation (e.g., 5G) wireless communication networks, also referred to as New Radio (NR) networks. While URLLC is aimed to provide high reliability and low latency services, a design to achieve both objectives can be challenging. As contemplated in NR networks, a URLLC reliability requirement for transmission of a packet may be considered successful if the transmission has a 1-10^-5% error rate for every 32 bytes with a user plane latency of 1 millisecond. In legacy long-term-evolution (LTE) systems, LTE shortened transmission time interval (sTTI) has been used for latency reduction. While URLLC may inherit the legacy LTE sTTI design for latency reduction, achieving high-reliability URLLC transmission still presents challenges. For example, as a Hybrid Automatic Repeat reQuest (HARQ) may be not available for a URLLC control channel, URLLC must consider other mechanisms to achieve high reliability while also meeting the stringent low latency requirement.

Thus, there is a need in the art for highly reliable transmission for URLLC data and control channels.

SUMMARY

The present disclosure is directed to systems and methods for high-reliability URLLC control and data channel transmissions.

In a first aspect of the present application, a method is disclosed, the method comprising: receiving, by a user equipment (UE), first downlink control information (DCI) in a first control resource set (CORESET), the first DCI providing scheduling information for transmission of first data over a first physical downlink shared channel (PDSCH); receiving, by the UE, second DCI in a second CORESET, the second DCI providing scheduling information for transmission of second data over a second PDSCH; receiving, by the UE, the first data over the first PDSCH; receiving, by the UE, the second data over the second PDSCH; wherein the first data and the second data are repetition data.

In one implementation of the first aspect, the first DCI is received by the UE over a first physical downlink control channel (PDCCH), and the second DCI is received by the UE over a second PDCCH.

In another implementation of the first aspect, the first CORESET and the second CORESET each include a decoding order for decoding the respective first DCI and second DCI.

In yet another implementation of the first aspect, the first CORESET and the second CORESET are received using at least one of: different time resources; different frequency resources; or different beams.

In yet another implementation of the first aspect, the UE refers to at least one of a time reference signal and a frequency reference signal in the second data to decode the first data.

In yet another implementation of the first aspect, the method further comprises soft combining the first data and the second data by the UE.

In yet another implementation of the first aspect, the method further comprises: ignoring, by the UE, one of the first DCI and the second DCI; and decoding, by the UE, a corresponding one of the first data over the first PDSCH and the second data over the second PDSCH, using the other one of the first DCI and the second DCI.

In yet another implementation of the first aspect, the first DCI includes at least one of: a first redundancy version information element, a first new data indicator information element, a first hybrid automatic repeat request (HARM) process number, or a first new data indicator (NDI); the second DCI includes at least one of: a second redundancy version information element, a second new data indicator information element, a second HARQ process number, or a second NDI; wherein at least one of: the first and second redundancy version information elements are the same; the first and second new data indicator information elements are the same; the first and second HARQ process number are the same; or the first and second NDIs are the same.

In yet another implementation of the first aspect, the method further comprises receiving, by the UE, third DCI in a third CORESET, the third DCI providing scheduling information for transmission of the first data.

In yet another implementation of the first aspect, the third DCI is received by the UE over a third PDCCH.

In yet another implementation of the first aspect, the first DCI and the third DCI have at least one of different coding rates or different aggregation levels.

In yet another implementation of the first aspect, the method further comprises soft combining, by the UE, the first DCI and the third DCI to form a combined DCI for obtaining the scheduling information for transmission of the first data.

In yet another implementation of the first aspect, the method further comprises ignoring, by the UE, one of the first DCI and the third DCI; and decoding, by the UE, the first data over the first PDSCH using the other one of the first DCI and the third DCI.

In yet another implementation of the first aspect, at least one of: the first PDCCH and the second PDCCH are repetition PDCCHs; the first PDCCH and the third PDCCH are repetition PDCCHs; or the second PDCCH and the third PDCCH are repetition PDCCHs.

In a second aspect of the present application, a user equipment (UE) is disclosed, the UE comprising: one or more non-transitory computer-readable media having computer-executable instructions embodied thereon; at least one processor coupled to the one or more non-transitory computer-readable media, and configured to execute the computer-executable instructions to: receive first downlink control information (DCI) in a first control resource set (CORESET), the first DCI providing scheduling information for transmission of first data over a first physical downlink shared channel (PDSCH); receive second DCI in a second CORESET, the second DCI providing scheduling information for transmission of second data over a second PDSCH; receive the first data over the first PDSCH; receive the second data over the second PDSCH; wherein the first data and the second data are repetition data.

In one implementation of the second aspect, the first DCI is received by the UE over a first physical downlink control channel (PDCCH), and the second DCI is received by the UE over a second PDCCH.

In another implementation of the second aspect, the first CORESET and the second CORESET each include a decoding order for decoding the respective first DCI and second DCI.

In yet another implementation of the second aspect, the first CORESET and the second CORESET are received using at least one of: different time resources; different frequency resources; or different beams.

In yet another implementation of the second aspect, the UE refers to at least one of a time reference signal and a frequency reference signal in the second data to decode the first data.

In yet another implementation of the second aspect, the first data is encoded using a first modulation scheme based on the first DCI, and the second data is encoded using a second modulation scheme based on the second DCI.

In yet another implementation of the second aspect, the at least one processor is further configured to execute the computer-executable instructions to: ignore one of the first DCI and the second DCI; and decode a corresponding one of the first data over the first PDSCH and the second data over the second PDSCH using the other one of the first DCI and the second DCI.

In yet another implementation of the second aspect, the first DCI includes at least one of: a first redundancy version information element, a first new data indicator information element, a first hybrid automatic repeat request (HARQ) process number, or a first new data indicator (NDI); the second DCI includes at least one of: a second redundancy version information element, a second new data indicator information element, a second HARQ process number, or a second NDI; wherein at least one of: the first and second redundancy version information elements are the same; the first and second new data indicator information elements are the same; the first and second HARQ process number are the same; or the first and second NDIs are the same.

In yet another implementation of the second aspect, the at least one processor is further configured to execute the computer-executable instructions to: receive third DCI in a third CORESET, the third DCI providing scheduling information for transmission of the first data over the first PDSCH.

In yet another implementation of the second aspect, the third DCI is received by the UE over a third PDCCH.

In yet another implementation of the second aspect, the first DCI and the third DCI have at least one of different coding rates or different aggregation levels.

In yet another implementation of the second aspect, the at least one processor is further configured to execute the computer-executable instructions to: soft combine the first DCI and the third DCI to form a combined DCI for obtaining the scheduling information for transmission of the first data.

In yet another implementation of the second aspect, the at least one processor is further configured to execute the computer-executable instructions to: ignore one of the first DCI and the third DCI; and decode the first data over the first PDSCH using the other one of the first DCI and the third DCI.

In yet another implementation of the second aspect, at least one of: the first PDCCH and the second PDCCH are repetition PDCCHs; the first PDCCH and the third PDCCH are repetition PDCCHs; or the second PDCCH and the third PDCCH are repetition PDCCHs.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 8 is a diagram illustrating an exemplary CORESET configuration having an explicit indication of decoding order for a high-reliability data channel, according to an example implementation of the present application.

FIG. 9A is a diagram illustrating DCI decoded from a CORESET, according to an example implementation of the present application.

FIG. 9B a diagram illustrating DCI decoded from another CORESET, according to an example implementation of the present application.

FIG. 9C is a diagram illustrating DCI decoded from yet another CORESET, according to an example implementation of the present application.

DETAILED DESCRIPTION

Figure 1:
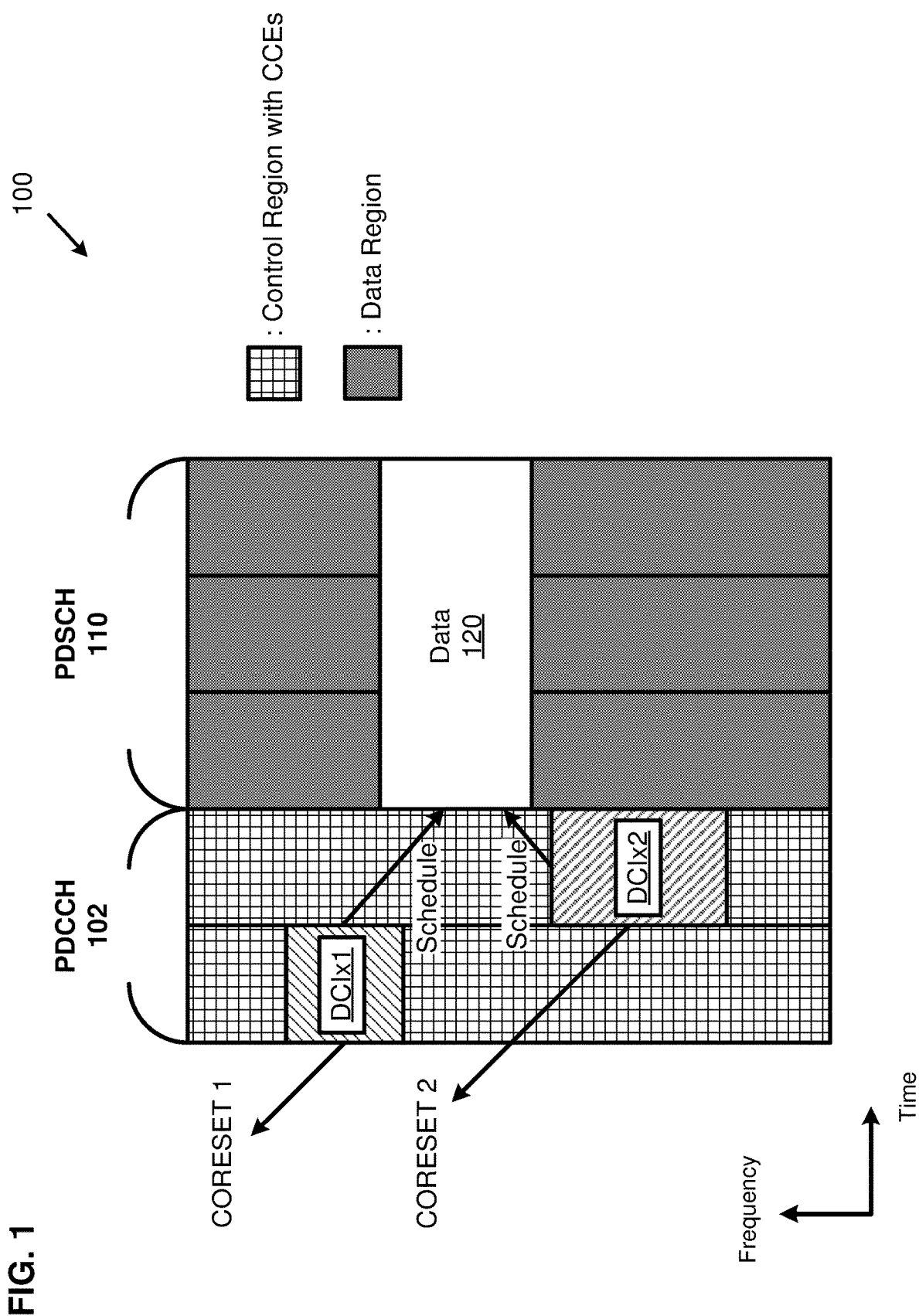
FIG. 1 is a schematic diagram illustrating multiple control resource sets (CORESETS) containing repetition downlink control information (DCI) in a physical downlink control channel (PDCCH) for scheduling the same data in a physical downlink shared channel (PDSCH), according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as eMBB, mMTC, and URLLC, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

FIG. 1 is a schematic diagram illustrating multiple CORESETs containing repetition DCI in a PDCCH for scheduling the same data in a PDSCH, according to an example implementation of the present application. While the methods described in the present disclosure relate to URLLC service, the methods are not limited to URLLC service but can also include other types of data transmission.

To support the transmission of downlink (and uplink) transport channels, downlink (and uplink) shared channel control signaling is required. The control signaling enables a UE to successfully receive, demodulate, and decode data transmitted through the downlink shared channel. In a 5G NR network, the DCIs (e.g., having information about downlink shared channel resource allocation, transport format, and etc.) are transmitted from a base station through a PDCCH, and can be decoded from one or more CORESETs in a CORESET configuration transmitted to the UE from the base station, for example.

As shown in FIG. 1, diagram 100 includes PDCCH 102 and PDSCH 110. PDCCH 102 includes a plurality of control channel elements (CCEs), where CORESET 1 and CORESET 2 reside in the CCEs. CORESETs 1 and 2 contain information to decode DCIx1 and DCIx2, respectively. PDSCH 110 includes data 120 (e.g., URLLC data). PDCCH 102 and PDSCH 110 may be configured by a base station (e.g., a next generation Node B (gNB)), and transmitted to a UE.

As shown in FIG. 1, in PDCCH 102, several CORESETs are included so that the UE can monitor data scheduling information. For example, the UE may monitor and blind decode CORESETs 1 and 2 to obtain DCIx1 and DCIx2, respectively, for receiving data 120 (e.g., URLLC data) in PDSCH 110. Since users (e.g., URLLC data users) may not need to monitor common search space in consideration for latency reduction, they can attempt to monitor and decode UE-specific search spaces based on, for example, Cell-Radio Network Temporary Identifier (C-RNTI) and the configuration of CORESET from higher layers (e.g., media access control (MAC) layer and radio resource control (RRC) layer).

In the present example implementation, CORESET 1 may include frequency resource location, time resource location, and information related to decoding DCIx1. For example, the information related to decoding DCIx1 may include, not is not limited to, maximum number of blind decoding attempt per aggregation level or per CORESET (e.g., PDCCH candidates), aggregation level and coding rate of the DCIx1, and spatial information of CORESET 1 (e.g., reception beam information). Similarly, CORESET 2 may include frequency resource location, time resource location, and information related to decoding DCIx2. For example, the information related to decoding DCIx2 may include, not is not limited to, maximum number of blind decoding attempt per aggregation level or per CORESET (e.g., PDCCH candidates), aggregation level and coding rate of DCIx2, and spatial information of CORESET 2 (e.g., reception beam information). Moreover, the frequency resource location may be configured in a CORESET configuration, while time resource location may be configured in a search space configuration associated with the CORESET configuration. The search space configuration may be configured separately from the time and frequency configurations, and the CORESET may include a search space index or a search space identifier (ID) indicating what search space configuration is provided when the search space configuration is not included in the CORESET. Also, the DCIs for scheduling the same data transmission in the PDSCH are repeated in one or more PDCCHs.

In various implementations of the present application, to improve reliability of control channel transmissions, DCI can apply a lower coding rate. Because a lower coding rate may lead to a larger payload size of the DCI, a higher aggregation level may be applied to the DCI. In the present example implementation, the transmissions of DCIx1 and DCIx2 in PDCCH 102 have different coding rates and different aggregation levels to save control channel resources. For example, DCIx1 may have a higher coding rate and a lower aggregation level than DCIx2. It should be understood that different aggregation levels may result in different search space configurations. In one implementation, DCIx1 and DCIx2 are transmitted in different time resources (e.g., frame(s), subframe(s), slot(s), or symbol(s)) and/or frequency resources (e.g., frame(s), subframe(s), slot(s), or symbol(s)) of PDCCH 102. As illustrated in FIG. 1, DCIx1 is transmitted at a higher frequency band than DCIx2, and an earlier time slot than DCIx2. In another implementation, DCIx1 and DCIx2 may be transmitted in the same time resource, but in different frequency resources of PDCCH 102. In yet another implementation, DCIx1 and DCIx2 may be transmitted in the same frequency resource, but in different time resources of PDCCH 102.

In the present implementation, although DCIx1 and DCIx2 have different coding rates and/or different aggregation levels, they are repetition DCIs, having the same content for providing scheduling information for decoding the same data 120 (e.g., URLLC data) in PDSCH 110 as shown in FIG. 1. Data 120 received in PDSCH 110 based on the corresponding DCIs can be in transport blocks or in code block groups. By transmitting repetition DCIs (e.g., DCIx1 and DCIx2) in one or more control channels (e.g., PDCCH 102), where each DCI includes the same scheduling information for the same data in the PDSCH (e.g., PDSCH 110), the reliability of URLLC control channel transmission can be improved.

In another example implementation, DCIx1 and DCIx2 may have different coding rates and the same aggregation level. In yet another example implementation, DCIx1 and DCIx2 may have the same coding rate and different aggregation levels. Higher aggregation levels may result in higher blocking probability (e.g., DCIs for different UEs transmitted in overlapped control channel resources due to limited control channel resources).

In the present example implementation, since multiple CORESETs are included in PDCCH 102, the UE may decode the CORESETs in an order that is explicitly or implicitly indicated in the CORESET configuration.

Figure 2A:
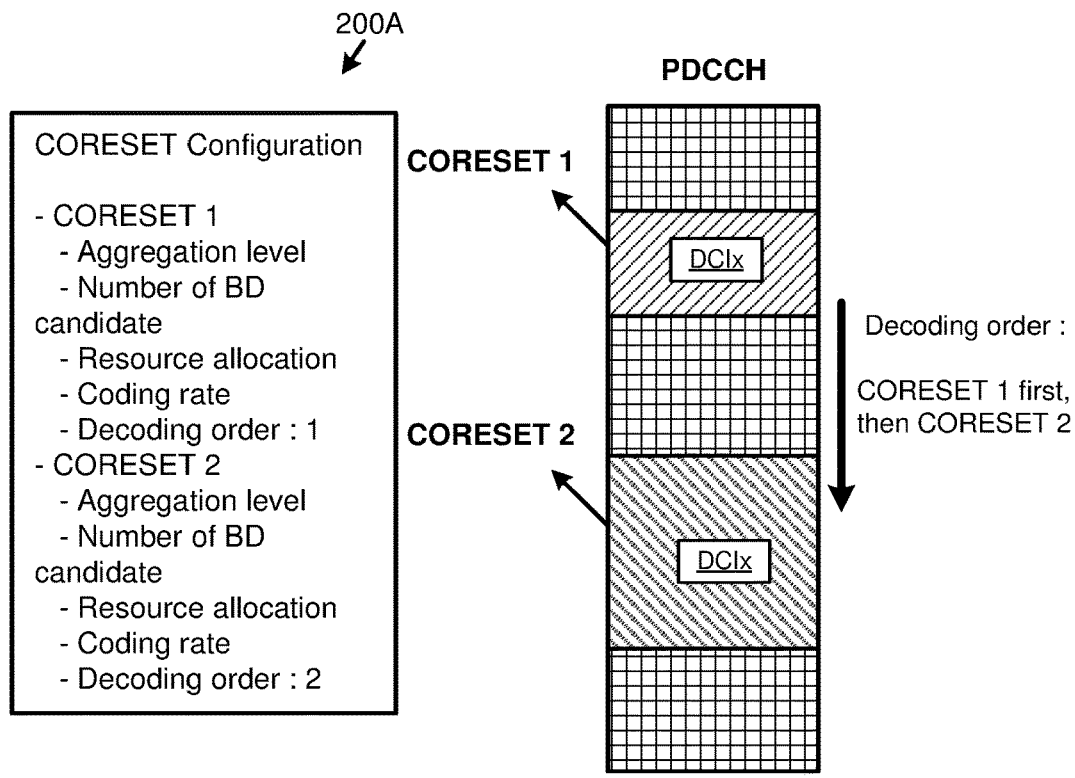
FIG. 2A is a diagram illustrating a CORESET configuration having an explicit indication of decoding order, according to an example implementation of the present application.

In the case of an explicit indication, each CORESET may be configured with a decoding order number. FIG. 2A is a diagram illustrating a CORESET configuration having an explicit indication of decoding order, according to an example implementation of the present application. For example, in CORESET configuration 200A, the decoding order number of CORESET 1 is 1, while the decoding order number of CORESET 2 is 2. Thus, the UE may attempt to decode CORESET 1 first before decoding CORESET 2 to obtain the corresponding DCIs. If the UE successfully decodes CORESET 1, the UE may decide not to decode CORESET 2 for latency reduction. If the UE fails to decode CORESET 1, the UE may attempt to decode CORESET 2. If the UE successfully decodes CORESET 1, the UE may also decide to decode CORESET 2, and perform soft combining of the decoded DCIx1 and DCIx2 to improve reliability of the URLLC control channel.

Figure 2B:
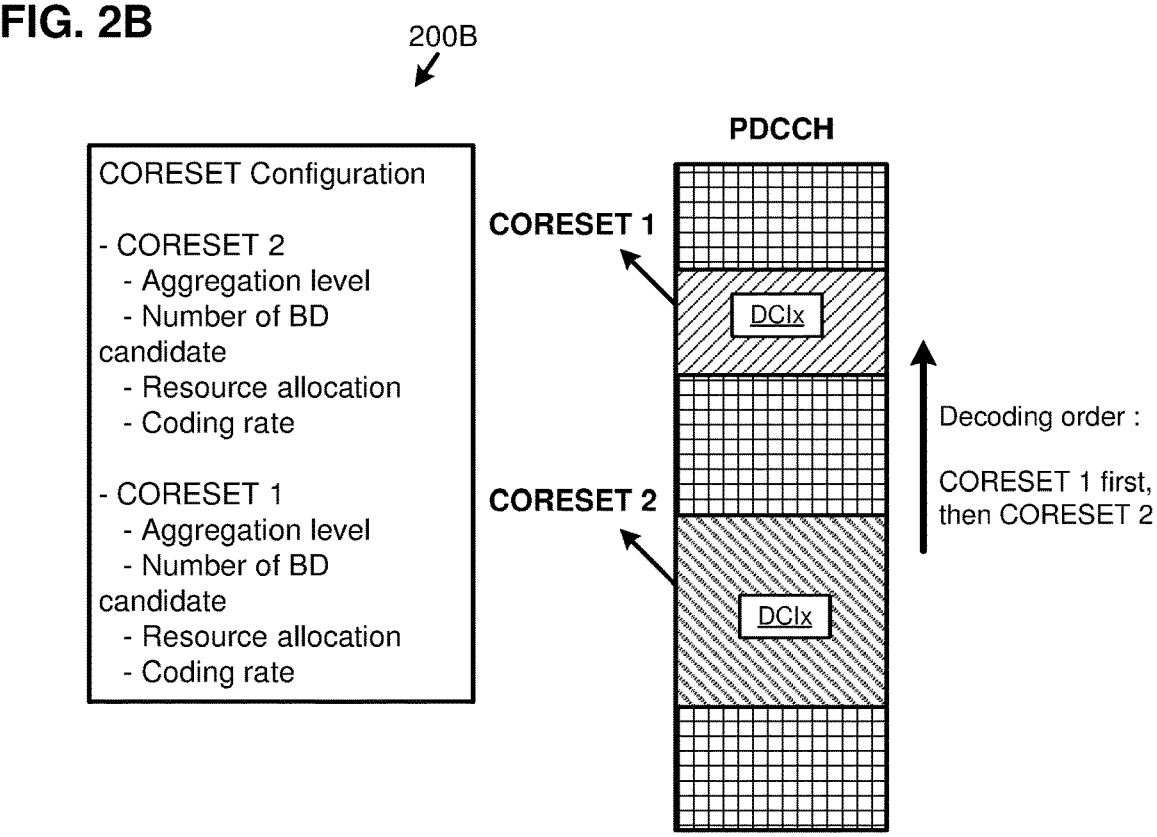
FIG. 2B is a diagram illustrating a CORESET configuration having an implicit indication of decoding order, according to an example implementation of the present application.

In the case of an implicit indication, a decoding order number is not explicitly indicated in each CORESET configuration. Instead, the order in which the CORESETs are arranged in the CORESET configuration may be regarded as the decoding order for the UE to blind decode to receive the respective DCIs. FIG. 2B is a diagram illustrating a CORESET configuration having an implicit indication of decoding order, according to an example implementation of the present application. For example, in CORESET configuration 200B, CORESET 2 is listed before CORESET 1 in the CORESET configuration. Thus, the UE may attempt to decode CORESET 2 first before decoding CORESET 1 to obtain the corresponding DCIs. If the UE successfully decodes CORESET 2, the UE may decide not to decode CORESET 1 for latency reduction. If the UE fails to decode CORESET 2, the UE may attempt to decode CORESET 1. If the UE successfully decodes CORESET 2, the UE may also decide to decode CORESET 1, and perform soft combining of the decoded DCIx1 and DCIx2 to improve reliability of the URLLC control channel. In the example implementations shown in FIGS. 2A and 2B, a high-reliability URLLC control channel is achieved by using repetition transmissions of DCIs (e.g., DCIx1 and DCIx2) within the same time resource (e.g., region) for scheduling the same data.

In other implementations, the decoding order may be implicitly indicated to the UE based on DCI size, DCI format, or RNTI. For example, the decoding order of the CORESETs may be based on the size of the DCIs (e.g., decoding from the DCI with the largest size to the DCI with the smallest size, or vice versa).

Figure 3:
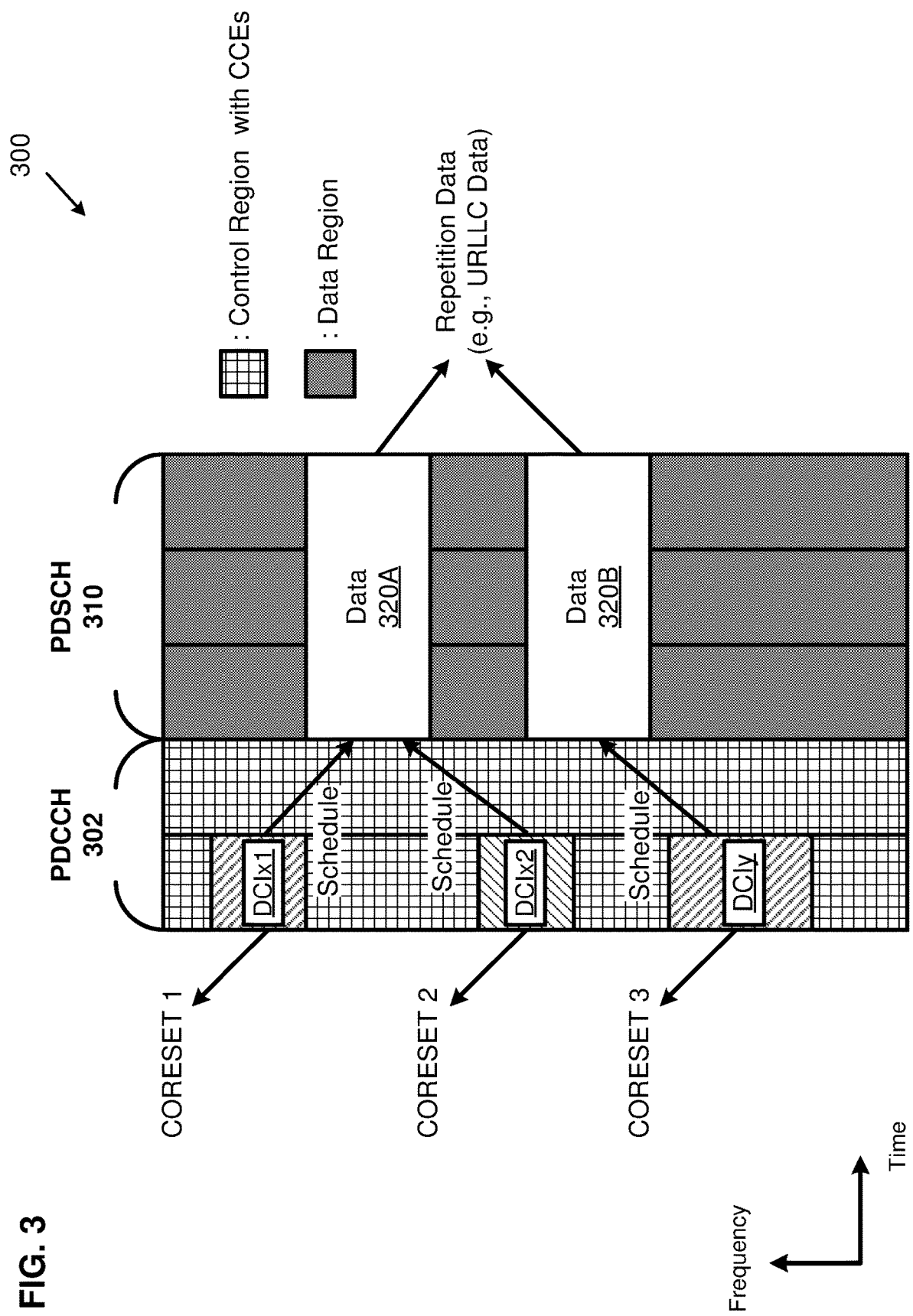
FIG. 3 is a schematic diagram illustrating multiple CORESETs containing different DCIs in a PDCCH for scheduling repetition URLLC data in a PDSCH, according to an example implementation of the present application.

FIG. 3 is a schematic diagram illustrating multiple CORESETs containing different DCIs in a PDCCH for scheduling repetition data transmissions in a PDSCH, according to an example implementation of the present application. As shown in FIG. 3, diagram 300 includes PDCCH 302 and PDSCH 310. PDCCH 302 includes a plurality of control channel elements (CCEs), where CORESETs 1, 2, and 3 reside in the CCEs. CORESETs 1, 2, and 3 contain information to decode DCIx1, DCIx2, and DCIy, respectively. PDSCH 310 includes data 320A and data 320B (e.g., URLLC data), where data 320A and data 320B are repetition transmissions of the same data (e.g., URLLC data) located on different frequency (and/or time) resources in PDSCH 310. PDCCH 302 and PDSCH 310 may be configured by a base station (e.g., a gNB), and transmitted to a UE.

As shown in FIG. 3, in PDCCH 302, several CORESETs are included so that the UE can monitor data scheduling information. For example, the UE may monitor and blind decode CORESETs 1, 2, and 3 to obtain DCIx1, DCIx2, and DCIy, respectively, where DCIx1 and DCIx2 may include the same content for providing scheduling information for decoding data 320A (e.g., URLLC data) in PDSCH 310, while DCIy may include content for providing scheduling information for decoding data 320B (e.g., repetition URLLC data) in PDSCH 310. Since users (e.g., URLLC data users) may not need to monitor common search space in consideration for latency reduction, they can attempt to monitor and decode UE-specific search spaces based on, for example, Cell-Radio Network Temporary Identifier (C-RNTI) and the configuration of CORESET from higher layers (e.g., media access control (MAC) layer and radio resource control (RRC) layer).

In the present example implementation, CORESET 1 may include frequency resource location, time resource location, and information related to decoding DCIx1 (e.g., maximum number of blind decoding attempt per aggregation level or per CORESET (e.g., PDCCH candidates), aggregation level and coding rate of the DCIx1, and spatial information of CORESET 1 (e.g., RX beam information)). Similarly, CORESET 2 may include frequency resource location, time resource location, and information related to decoding DCIx2, (e.g., maximum number of blind decoding attempt per aggregation level or per CORESET (i.e., PDCCH candidates), aggregation level and coding rate of DCIx2, and spatial information of CORESET 2 (e.g., RX beam information)). In addition, CORESET 3 may include frequency resource location, time resource location, and information related to decoding DCIy (e.g., maximum number of blind decoding attempt per aggregation level or per CORESET (e.g., PDCCH candidates), aggregation level and coding rate of DCIy, and spatial information of CORESET 3 (e.g., RX beam information)). Moreover, the frequency resource location may be configured in a CORESET configuration, while time resource location may be configured in a search space configuration associated with the CORESET configuration. The search space configuration may be configured separately from the time and frequency configurations, and the CORESET may include a search space index or a search space ID indicating what search space configuration is provided when the search space configuration is not included in the CORESET. Also, the DCIs for scheduling the same data transmission in the PDSCH are repeated in one or more PDCCHs.

In FIG. 3, DCIx1 and DCIx2 both contain the scheduling information of the transmission of data 320A, while DCIy contains the scheduling information of the transmission of data 320B, where data 320A and data 320B are repetition transmissions of the same data (e.g., URLLC data) located on different frequency (and/or time) resources in PDSCH 310.

In FIG. 3, CORESET 1 and CORESET 2 respectively contain DCIx1 and DCIx2, which are repetition DCIs having the same content for providing scheduling information for decoding data 320A in PDSCH 310 as shown in FIG. 3. CORESET 3 contains DCIy, which includes scheduling information of the transmission of data 320B. In the present implementation, data 320A and data 320B are repetition transmissions of the same data (e.g., URLLC data) located in different frequency (and/or time) resources in PDSCH 310.

To improve control channel reliability, a DCI can apply lower coding rate. Because a lower coding rate induces a larger payload size of the DCI, a higher aggregation level may be applied to the DCI. In the present example implementation, the repetition transmissions of DCIx1 and DCIx2 have different coding rates and/or different aggregation levels to save more control channel resource as compared to both DCIs applying higher aggregation levels. For example, DCIx1 may have a higher coding rate and a lower aggregation level than DCIx2. It should be noted that, although DCIx1 and DCIx2 have different coding rates and different aggregation levels, they have the same content for scheduling the same data (e.g., URLLC data 320A) in PDSCH 310. By transmitting repetition DCIs (e.g., DCIx1 and DCIx2) in one or more control channels (e.g., PDCCH 302), where each DCI has the same content to schedule the same data (e.g., same data block) in PDSCH 310, the reliability of URLLC control channel can be improved.

As further shown in FIG. 3, CORESET 3 contains DCIy, which is different from DCIx1 and DCIx2 (collectively referred to as "DCIx"). For example, while DCIx contains the scheduling information of data 320A, and DCIy contains the scheduling information of data 320B. DCIx and DCIy may contain different resource allocation information. For example, data 320A may be located on different time and/or frequency resources in PDSCH 310 than data 320B. So, DCIx and DCIy may include different information elements to reflect such differences. In other words, DCIx and DCIy are not repetition DCIs. Moreover, the resource allocation information may be different between DCIx and DCIy, or the number of bits may be different between DCIx and DCIy. However, although data 320A and data 320B are located in different regions (e.g., time and/or frequency regions) of PDSCH 310, they are repetition transmissions of the same data (e.g., URLLC data). As a result, the decoded data (e.g., data 320A and data 320B) can achieve higher time or frequency diversity for a high-reliability data channel (e.g., URLLC data channel).

In one example implementation, DCIy may contain information revealing that the scheduled data (e.g., data 320B) of DCIy is the same as the scheduled data (e.g., data 320A) of DCIx. Moreover, DCIy may contain explicit bits for repetition PDSCH or the same HARQ process number as those of DCIx. The DCIx and DCIy may include information elements, such as a new data indicator and/or a redundancy version, for a UE to obtain information of the corresponding data for each DCI. For example, if both the new data indicator and the redundancy version in DCIy are the same as those in DCIx (although the resource allocation information may be different), then the UE may consider DCIx and DCIy as scheduling the same data.

In one example implementation, when the UE successfully decodes both DCIx and DCIy, and successfully decodes data 320A scheduled by DCIx, the UE may decide whether to optionally decode data 320B scheduled by DCIy in consideration of specific latency requirements for the URLLC, as decoding data 320B may increase latency. In another example implementation, after decoding data 320A scheduled by DCIx, the UE may continue to decode data 320B scheduled by DCIy, and perform soft combining among data 320A and data 320B (e.g., respectively indicated by DCIx and DCIy) to improve the reliability of the data channel (e.g., URLLC data channel).

It is noted that the modulation and coding scheme (MCS) applied to the URLLC data can be different between DCIx and DCIy. The UE may apply different corresponding demodulation and decoding schemes for the same data to achieve higher flexibility and/or diversity.

In one example implementation, data 320A and data 320B may be transmitted in the same time slot, and can share their reference signals for data decoding. For example, a UE can refer to time and frequency reference signals transmitted in data 320B to decode data 320A, so that DCIx does not have to include time and frequency reference signals, or vice versa. Data 320A and data 320B received in PDSCH 310 based on the corresponding DCIs can be in transport blocks or in code block groups.

It is noted that, in one implementation, only when the UE fails to decode all relative DCIs, then the UE may consider a control channel failure and count the number for further error handling (e.g. beam failure or radio link failure (RLF)). If the UE can decode at least one DCI based on a higher layer CORESET configuration, the UE may not count the number for error handling, even if there are decoding failures for other configured CORESETs. It is also noted that implementations of the present application can be also used for the grant-free DL transmission, such as preemption transmission. In the present example implementation shown in FIG. 3, a high-reliability data channel is achieved by using repetition transmissions of repetition data 320A and data 320B within the same time slot. In other implementations, repetition transmissions of repetition data 320A and data 320B may occur in different time and/or frequency resources.

Figure 4:
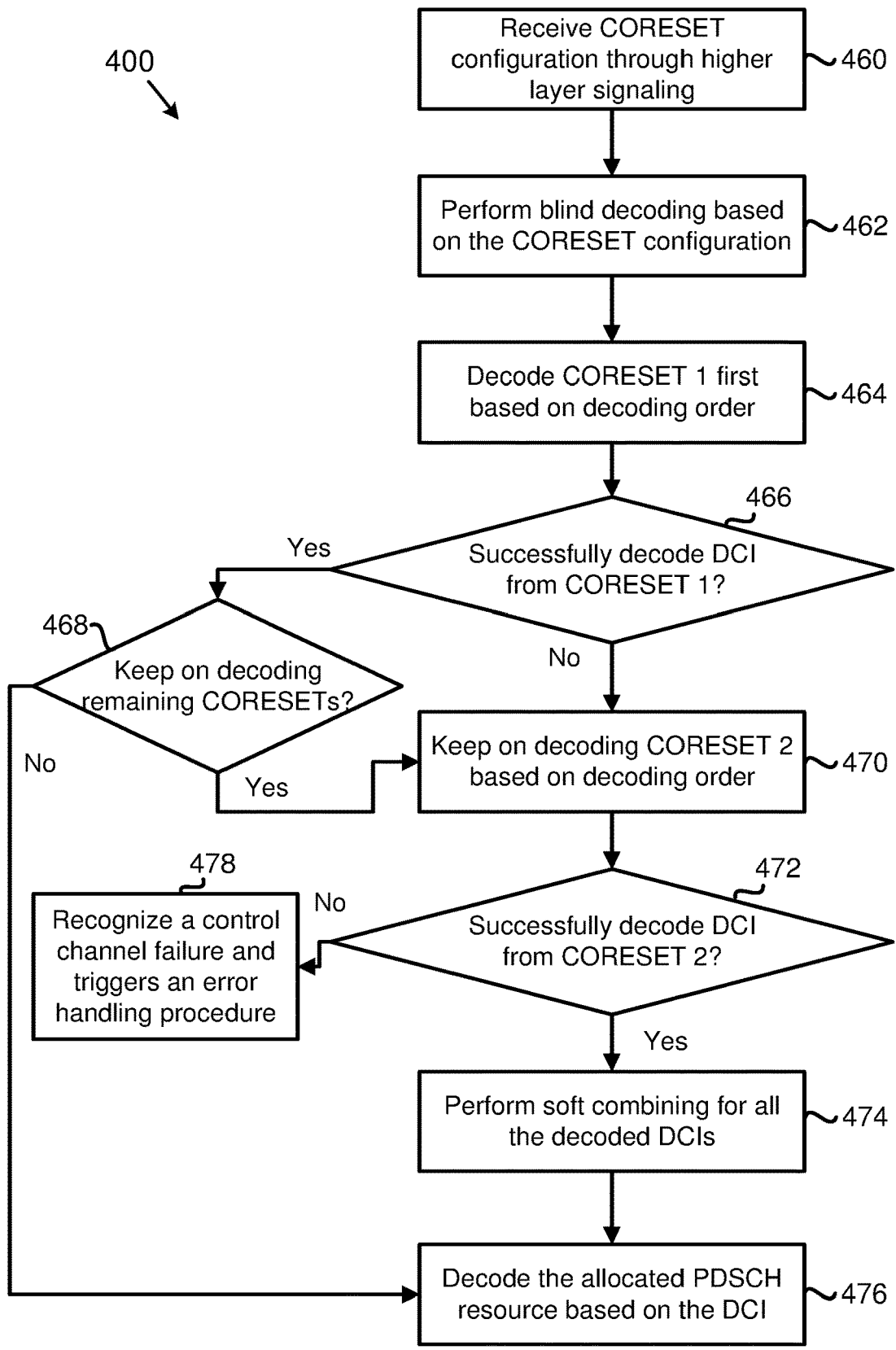
FIG. 4 illustrates a flowchart of a method for a high-reliability URLLC control channel, according to an example implementation of the present application.

FIG. 4 illustrates a flowchart of a method for a high-reliability URLLC control channel, according to an example implementation of the present application.

In action 460, a UE (e.g., for transmitting/receiving URLLC data) receives a CORESET configuration (having multiple CORESETs) from a base station (e.g., a gNB) through higher layer signaling (e.g., MAC control elements (CEs) or RRC signaling).

Figure 5A:
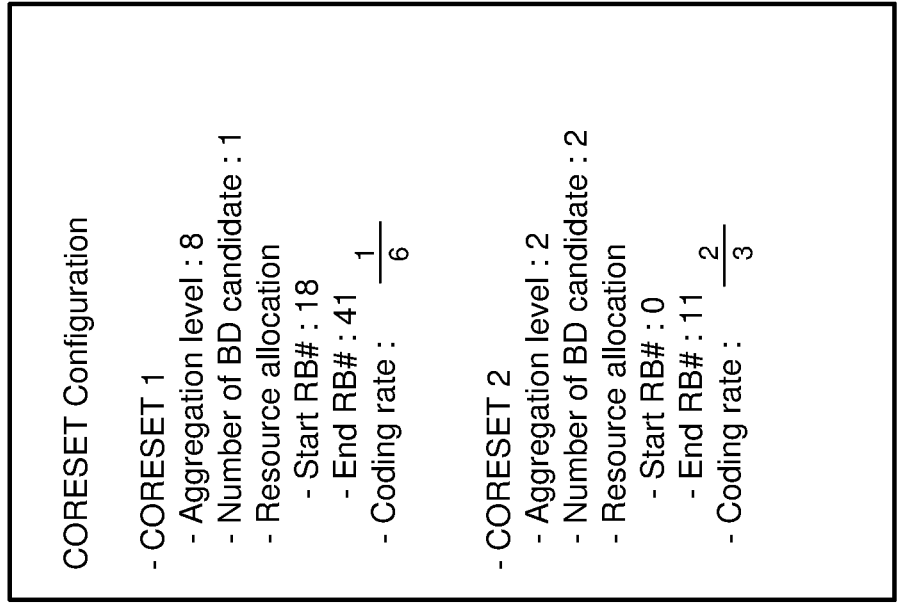
FIG. 5A is a diagram illustrating a CORESET configuration having an explicit indication of decoding order for a high-reliability URLLC control channel, according to an example implementation of the present application.

With reference to FIG. 5A, FIG. 5A is a diagram illustrating a CORESET configuration having an explicit indication of decoding order for a high-reliability control channel (e.g., URLLC control channel), according to an example implementation of the present application. In FIG. 5A, CORESET configuration 500A includes CORESET 1 and CORESET 2. CORESET 1 indicates that the aggregation level is 8, the number of blind detection/decoding (BD) candidates is 1, the resource allocation starts from resource block (RB) 18 and ends at RB 41, the coding rate is ⅙, and the decoding order is 1. CORESET 2 indicates that the aggregation level is 2, the number of BD candidates is 2, the resource allocation starts from RB 0 and ends at RB 11, the coding rate is ⅔, and the decoding order is 2. In one implementation, the number of BD candidates is configured per CORESET. In another implementation, the number of BD candidates can be configured per aggregation level.

Figure 5B:
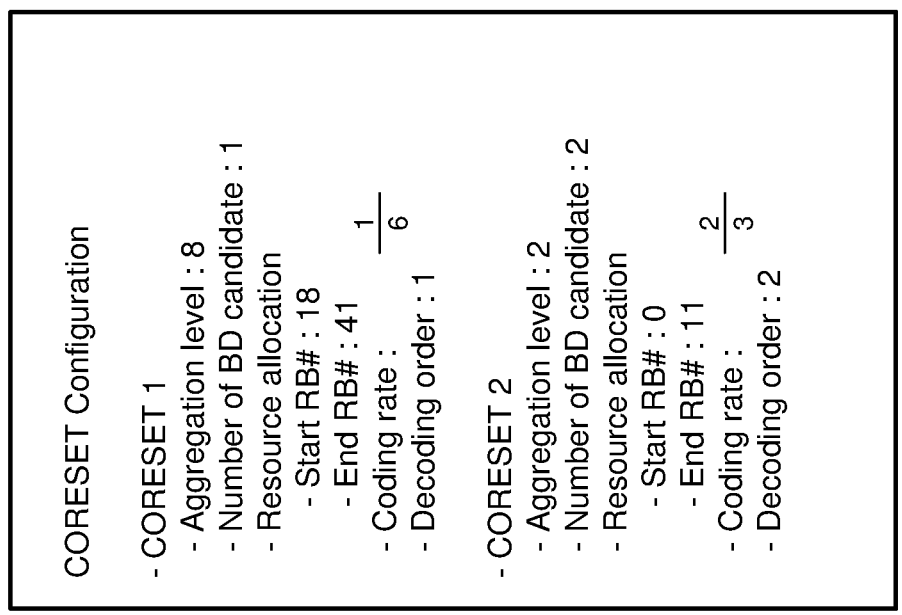
FIG. 5B is a diagram illustrating a CORESET configuration having an implicit indication of decoding order for a high-reliability URLLC control channel, according to an example implementation of the present application.

With reference to FIG. 5B, FIG. 5B is a diagram illustrating a CORESET configuration having an implicit indication of decoding order for a high-reliability control channel (e.g., URLLC control channel), according to an example implementation of the present application. In FIG. 5B, CORESET configuration 500B includes CORESET 1 and CORESET 2, which are substantially similar to CORESET 1 and CORESET 2, respectively, in FIG. 5A. The difference between FIG. 5B and FIG. 5A is that, in FIG. 5B, the decoding order number is not explicitly indicated in CORESET 1 and CORESET 2. It should be noted that in FIGS. 5A and 5B, the respective DCIs obtained from blind decoding CORESET 1 and CORESET 2 are the same, which are aimed to provide scheduling information for the same data (e.g., URLLC data) in the PDSCH.

Referring back to FIG. 4, in action 462 of flowchart 400, the UE performs blind decoding based on the CORESET configuration according to either an explicit or implicit indication of decoding order. In action 464, the UE decodes CORESET 1 first based on the decoding order, for example.

Figure 6:
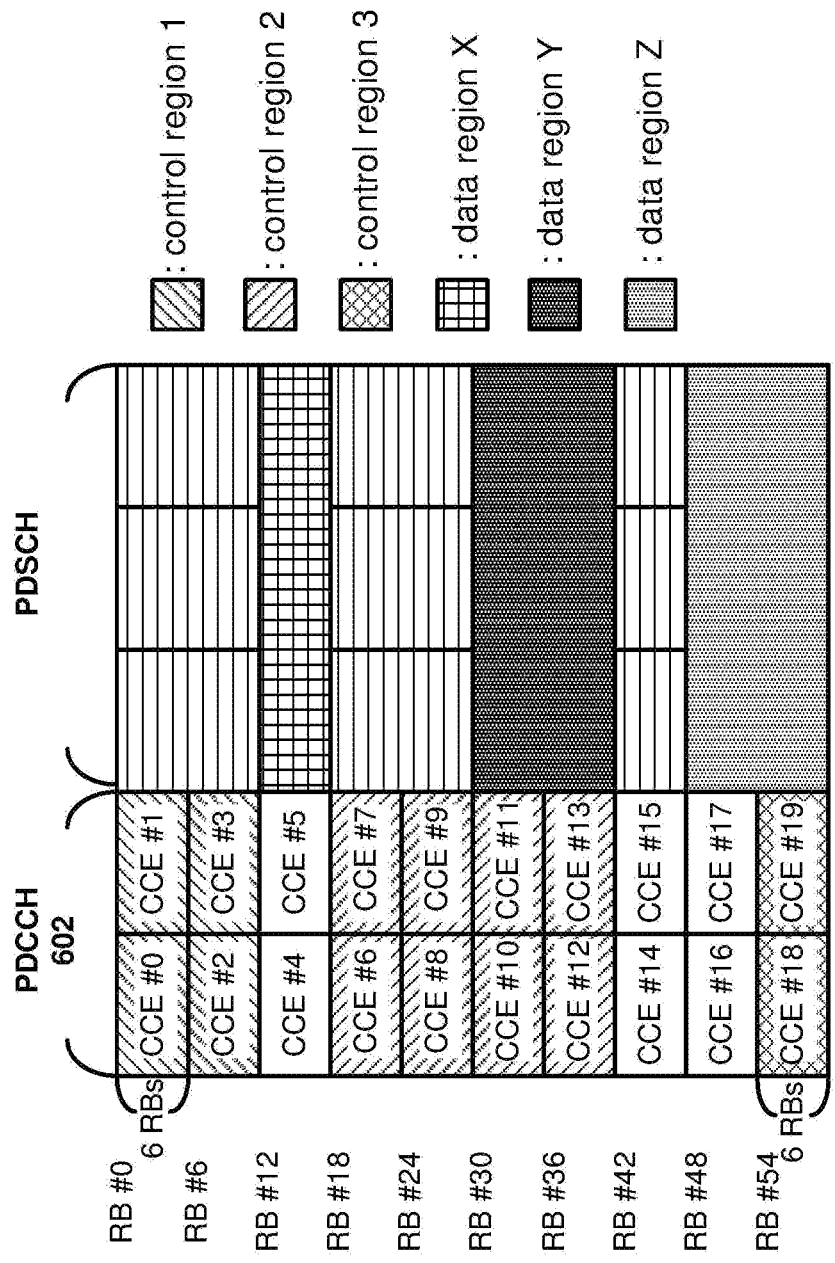
FIG. 6 is a diagram illustrating a URLLC channel structure, according to an example implementation of the present application.

With reference to FIG. 5A, since CORESET 1 has an explicit indication of decoding order of 1, the UE may decode CORESET 1 first (in action 464) before deciding whether to decode CORESET 2. With reference to FIG. 6, the UE may receive DCI corresponding to CORESET 1 by blind decoding RB 18 to RB 41 of control region 2 in PDCCH 602, based on the aggregation level of 8 and coding rate of ⅙.

Since CORESET 2 has an explicit indication of decoding order of 2 as shown in FIG. 5A, the UE may decode CORESET 2 (in action 470) if the UE fails to receive DCI by blind decoding CORESET 1 (in action 466). The UE may also decide (in action 468) to optionally decode CORESET 2 to improve reliability, after the UE successfully receives DCI by decoding CORESET 1 (in action 466). With reference to FIG. 6, the UE may receive DCI corresponding to CORESET 2 by blind decoding RB 0 to RB 11 of control region 1 in PDCCH 602, based on the aggregation level of 2 and coding rate of ⅔.

With reference to FIG. 5B, since a decoding order number is not explicitly indicated in CORESET 1 and CORESET 2, the order in which the CORESETs are arranged in the CORESET configuration is regarded as the decoding order for the UE to blind decode to receive the respective DCIs in the CORESETs. Thus, since CORESET 1 is arranged in the CORESET configuration before CORESET 2, as shown in FIG. 5B, the UE may decode CORESET 1 first (in action 464) before deciding whether to decode CORESET 2. With reference to FIG. 6, the UE may receive DCI corresponding to CORESET 1 by blind decoding RB 18 to RB 41 of control region 2 in PDCCH 602, according to the aggregation level of 8 and coding rate of ⅙.

Still in FIG. 5B, since CORESET 2 is arranged in the CORESET configuration after CORESET 1 in FIG. 5B, the UE may decode CORESET 2 (in action 470) if the UE fails to receive a DCI by blind decoding CORESET 1 (in action 466). The UE may also decide (in action 468) to blind decode CORESET 2 to receive DCI to improve reliability, after the UE successfully receives a DCI by decoding CORESET 1 (in action 466). With reference to FIG. 6, the UE may receive a DCI corresponding to CORESET 2 by blind decoding RB 0 to RB 11 of control region 1 in PDCCH 602, according to the aggregation level of 2 and coding rate of ⅔.

Referring back to FIG. 4, action 466 of flowchart 400 determines whether the UE successfully decodes DCI from CORESET 1. In action 466, if the UE successfully decodes DCI from CORESET 1, then flowchart 400 proceeds to action 468, where the UE decides whether to continue to decode the remaining CORESETs in the CORESET configuration according to the decoding order. In action 468, if the UE decides to decode the remaining CORESETs in the CORESET, then flowchart 400 proceeds to action 470, where the UE decodes the next CORESET (e.g., CORESET 2) according to the decoding order. Deciding to decode the remaining CORESETs may be beneficial to the URLLC as multiple DCIs from different CORESETs may be soft combined to increase reliability. In action 468, if the UE decides not to decode the remaining CORESETs in the CORESET configuration, then flowchart 400 proceeds to action 476, where the UE decodes the allocated PDSCH resource based on the DCI information to obtain the URLLC data. Deciding not to decode the remaining CORESETs may reduce latency of the URLLC.

In action 466, if the UE does not successfully decode DCI from CORESET 1, then flowchart 400 proceeds to action 470, where the UE decodes the next CORESET (e.g., CORESET 2) according to the decoding order.

Action 472 of flowchart 400 determines whether the UE successfully decodes DCI from CORESET 2. If the UE successfully decodes DCI from CORESET 2, then flowchart 400 proceeds to action 474, where the UE performs soft combining of all the decoded DCIs. Subsequently, in action 476, the UE decodes the allocated PDSCH resources based on the DCI information to obtain the URLLC data.

In action 472, if the UE does not successfully decode DCI from CORESET 2, then flowchart 400 proceeds to action 478, where the UE recognizes a failure in decoding all of the CORESETs in the CORESET configuration, and considers it as a control channel failure. For example, the UE may identify a PDCCH decoding error, and trigger an error handling procedure.

Figure 7:
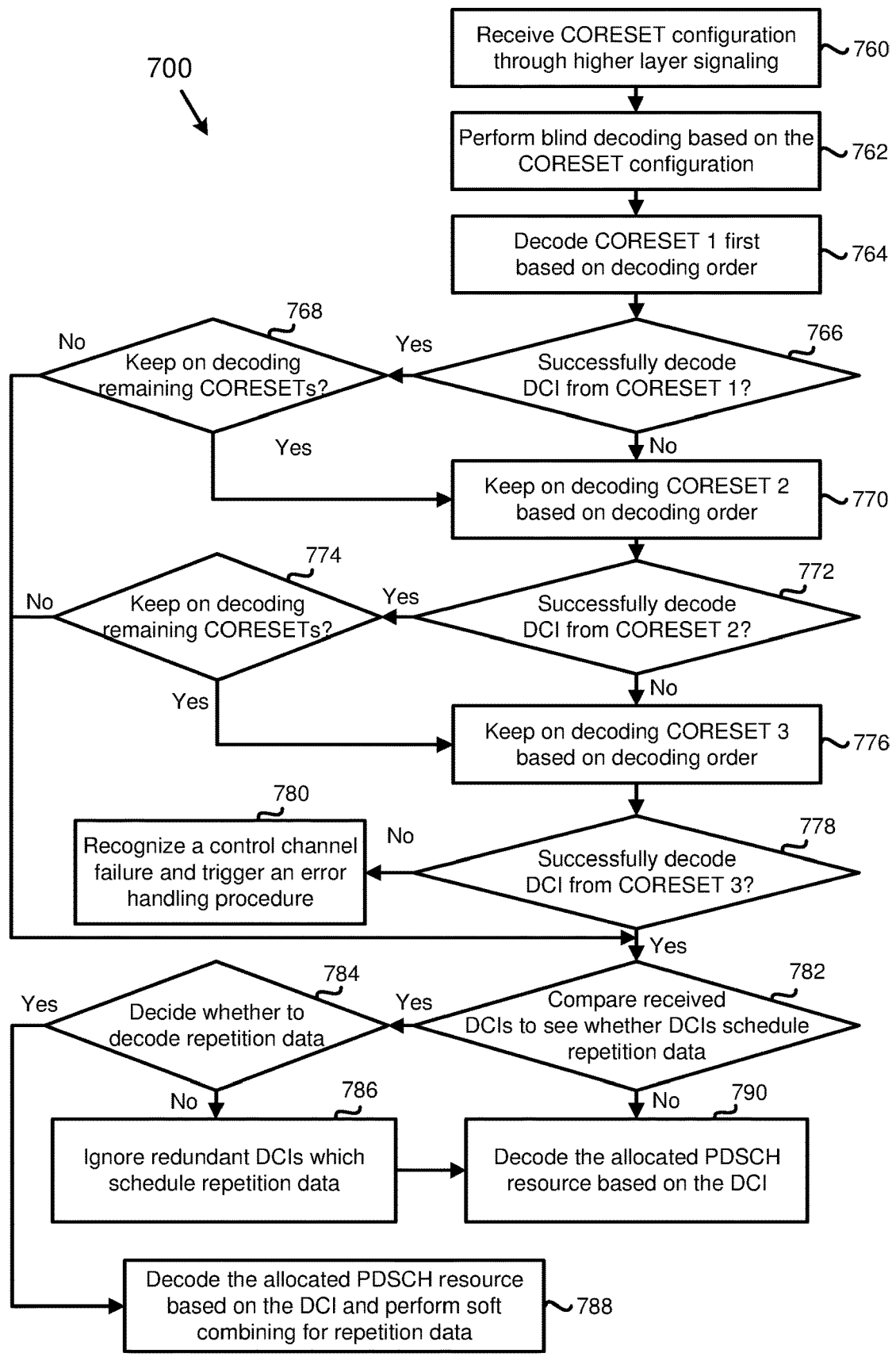
FIG. 7 illustrates a flowchart of a method for a high-reliability data channel, according to an example implementation of the present application.

FIG. 7 illustrates a flowchart of a method for a high-reliability data channel, according to an example implementation of the present application.

In action 760, a base station (e.g., a gNB) transmits, and a UE (e.g., a UE for transmitting/receiving URLLC data) receives, a CORESET configuration (having multiple CORESETs) through higher layer signaling (e.g., MAC CE or RRC signaling).

With reference to FIG. 8, FIG. 8 is a diagram illustrating an exemplary CORESET configuration having an explicit indication of decoding order for a high-reliability data channel, according to an example implementation of the present application. In FIG. 8, CORESET configuration 800 includes CORESET 1, CORESET 2, and CORESET 3. CORESET 1 indicates that the aggregation level is 8, the number of BD candidates is 1, the resource allocation starts from RB 18 and ends at RB 41, the coding rate is ⅙, and the decoding order is 1. CORESET 2 indicates that the aggregation level is 2, the number of BD candidates is 2, the resource allocation starts from RB 0 and ends at RB 11, the coding rate is ⅔, and the decoding order is 2. CORESET 3 indicates that the aggregation level is 1, the number of BD candidates is 2, the resource allocation starts from RB 54 and ends at RB 59, the coding rate is ¾, and the decoding order is 3. In one implementation, the number of BD candidates is configured per CORESET. In another implementation, the number of BD candidates can be configured per aggregation level.

It should be noted that, a decoding order number may not be explicitly indicated in CORESET 1, CORESET 2, and CORESET 3. In such a case, the order in which the CORESETs are arranged in the CORESET configuration may be regarded as the decoding order for the UE to blind decode to receive the respective DCIs in the CORESETs.

Referring back to FIG. 7, in action 762 of flowchart 700, the UE performs blind decoding based on the CORESET configuration according to either an explicit or implicit indication of decoding order. In action 764, the UE decodes CORESET 1 first according to the decoding order, for example, as indicated in CORESET configuration 800 in FIG. 8.

With reference to FIG. 8, since CORESET 1 has an explicit indication of decoding order of 1, the UE may decode CORESET 1 first (in action 764) before deciding whether to decode CORESET 2 and CORESET 3. With reference to FIGS. 6 and 8, the UE may receive DCI corresponding to CORESET 1 by blind decoding RB 18 to RB 41 of control region 2 in PDCCH 602, based on the aggregation level of 8 and coding rate of ⅙. Decoding order may be determined by implementation since determination to combine DCI is made by the UE. Moreover, DCIs may not contain the same content, however, DCIs may still indicate to the same data in the PDSCH.

Since CORESET 2 has an explicit indication of decoding order of 2 as shown in FIG. 8, the UE may decode CORESET 2 (in action 770) if the UE fails to receive DCI by blind decoding CORESET 1 (in action 766). The UE may also decide (in action 768) to decode CORESET 2 to improve reliability, after the UE successfully receives DCI by decoding CORESET 1 (in action 766). With reference to FIGS. 6 and 8, the UE may receive DCI corresponding to CORESET 2 by blind decoding RB 0 to RB 11 of control region 1 in PDCCH 602, based on the aggregation level of 2 and coding rate of ⅔.

Since CORESET 3 has an explicit indication of decoding order of 3 as shown in FIG. 8, the UE may decode CORESET 3 if the UE fails to receive DCI by blind decoding CORESET 2 (in action 772). The UE may also decide (in action 774) to optionally decode CORESET 3 to improve reliability, after the UE successfully receives DCI by decoding CORESET 2 (in action 772). With reference to FIGS. 6 and 8, the UE may receive DCI corresponding to CORESET 3 by blind decoding RB 54 to RB 59 of control region 3 in PDCCH 602, based on the aggregation level of 1 and coding rate of ¾.

Referring back to FIG. 7, action 766 of flowchart 700 determines whether the UE successfully decodes DCI from CORESET 1. In action 766, if the UE successfully decodes DCI from CORESET 1, then flowchart 700 proceeds to action 768, where the UE decides whether to continue to decode the remaining CORESETs in the CORESET configuration according to the decoding order. In action 768, if the UE decides to decode the remaining CORESETs in the CORESET configuration, then flowchart 700 proceeds to action 770, where the UE decodes the next CORESET (e.g., CORESET 2) according to the decoding order. Deciding to decode the remaining CORESETs may be beneficial to the URLLC as multiple DCIs from different CORESETs may be soft combined to increase reliability. In action 768, if the UE decides not to decode the remaining CORESETs in the CORESET configuration, then flowchart 700 proceeds to action 782, where the UE compares the received (e.g., decoded) DCIs to see whether the received DCIs schedule repetition data. Deciding not to decode the remaining CORESETs may be beneficial to the URLLC to reduce latency.

In action 766, if the UE does not successfully decode DCI from CORESET 1, then flowchart 700 proceeds to action 770, where the UE decodes the next CORESET (e.g., CORESET 2) according to the decoding order.

Action 772 of flowchart 700 determines whether the UE successfully decodes DCI from CORESET 2. If the UE successfully decodes DCI from CORESET 2, then flowchart 700 proceeds to action 774, where the UE decides whether to continue to decode the remaining CORESETs in the CORESET configuration. In action 774, if the UE decides to decode the remaining CORESETs in the CORESET configuration, then flowchart 700 proceeds to action 776, where the UE decodes the next CORESET (e.g., CORESET 3) according to the decoding order. Deciding to decode the remaining CORESETs may be beneficial to the URLLC as multiple DCIs from different CORESETs may be soft combined to increase reliability. In action 774, if the UE decides not to decode the remaining CORESETs in the CORESET configuration, then flowchart 700 proceeds to action 782, where the UE compares the received (e.g., decoded) DCIs to see whether the received DCIs schedule repetition data. Deciding not to decode the remaining CORESETs may be beneficial to the URLLC to reduce latency.

In action 772, if the UE does not successfully decode a DCI from CORESET 2, then flowchart 700 proceeds to action 776, where the UE decodes the next CORESET (e.g., CORESET 3) according to the decoding order. Action 778 of flowchart 700 determines whether the UE successfully decodes DCI from CORESET 3. If the UE successfully decodes DCI from CORESET 3, and there are no more CORESETs remaining in the CORESET configuration to be decoded, then flowchart 700 proceeds to action 782, where the UE compares the received (e.g., decoded) DCIs to see whether the received DCIs schedule repetition data.

If the UE does not successfully decode DCI from CORESET 3 in action 778, then flowchart 700 proceeds to action 780, where the UE recognizes a control channel failure, since the decoding of all CORESETs in the CORESET configuration have been unsuccessful. For example, the UE may identify a PDCCH decoding error, and trigger an error handling procedure.

Referring to FIG. 9A, as shown in FIG. 9A, the DCI is from control region 1, and includes information elements, such as a carrier indicator, a resource allocation header, resource allocation information (Start RB # and RB length), a modulation and coding scheme (MCS) index, a HARQ process number, a new data indicator, transmit power control (TPC) for PUCCH, and a downlink assignment index (DAI). In FIG. 9A, the resource allocation for the scheduled data starts from RB 12, and has an RB length of 6, which corresponds to data region X in FIG. 6. Also shown in FIG. 9A, the MCS index is 20. The HARQ number is 0. The new data indicator is 0.

As shown in FIG. 9B, the DCI is from control region 2, and includes information elements, such as carrier indicator, resource allocation header, resource allocation information (Start RB # and RB length), MCS index, HARQ number, new data indicator, TPC for PUCCH, and DAI. As shown in FIG. 9B, the resource allocation for the scheduled data starts from RB 30, and has an RB length of 12, which corresponds to data region Y in FIG. 6. Also shown in FIG. 9B, the MCS index is 10. The HARQ number is 0. The new data indicator is 0.

As shown in FIG. 9C, the DCI is from control region 3, and includes information elements, such as carrier indicator, resource allocation header, resource allocation information (Start RB # and RB length), MCS index, HARQ number, new data indicator, TPC for PUCCH, and DAI. As shown in FIG. 9C, the resource allocation for the scheduled data starts from RB 48, and has an RB length of 12, which corresponds to data region Z in FIG. 6. Also shown in FIG. 9C, the MCS index is 18. The HARQ number is 0. The new data indicator is 1.

In one implementation, the DCIs in FIGS. 9A, 9B, and 9C may further include bandwidth part(s) (BWP(s)) to indicate the corresponding frequency band(s) (e.g., by indicating the center frequency or using a BWP index where the indexing of BWP is pre-configured). In one implementation, the repetition data may be transmitted through different BWPs.

Referring back to FIG. 7, after decoding all of the CORESETs, the UE may decide to decode and receiving all the corresponding DCIs in action 782 of flowchart 700, the UE compares the received DCIs to determine whether there are received DCIs for scheduling repetition data in the PDSCH. For example, the UE may compare the corresponding information elements contained each DCI.

With reference to FIGS. 9A and 9B, in one implementation, because the DCI from control region 1 and the DCI from control region 2 have the same new data indicator (e.g., 0) and redundancy version, the UE considers the two DCIs schedule repetition data in the PDSCH. That is, data region X and data region Y in FIG. 6 contain repetition data. The UE may decide (in action 784) whether to decode the data in data region Y, if data from data region X can be successfully recovered, and vice versa. The UE may decide (in action 784) to decode both the data in data region X and in data region Y, and soft combining the data obtained from the two regions to increase reliability. If the UE decides (in action 784) not to decode both the repetition data in data region X and in data region Y, then the UE may decode the allocated PDSCH resource based on only one of the DCIs scheduling the respective data (in action 790), and ignore the rest of the redundant DCI(s) scheduling the respective data (in action 786).

With reference to FIG. 9C, in one implementation, because the DCI from control region 3 has a different new data indicator (e.g., 1) and redundancy version than those from DCIs shown in FIGS. 9A and 9B, the UE considers the DCI in region 3 schedule different data in data region Z than those contained in data regions X and Y. That is, data region Z in FIG. 6 does not contain repetition data as compared to data regions X and Y. Then, the UE needs to decode data region Z (in action 790), since data regions Z contains different data than what is contained in data regions X and Y.

Referring back to FIG. 7, in action 782 of flowchart 700, if the UE determines that there are no DCIs received for scheduling repetition data (same data), then flowchart 700 proceeds to action 790, where the UE decodes the allocated PDSCH resource based on the DCI to acquire the URLLC data. In action 782, if the UE determines that there are DCIs received for scheduling repetition data (same data), then flowchart 700 proceeds to action 784, where the UE decides whether to decode the repetition data. In action 784, if the UE decides to not decode the repetition data, then flowchart 700 proceeds to action 786, where the UE ignores the redundant DCIs which schedule repetition data, and then proceeds to action 790, where the UE decodes the allocated PDSCH resources based on the DCI to acquire the URLLC data. In action 784, if the UE decides to decode the repetition data, then flowchart 700 proceeds to action 788, where the UE decodes the allocated PDSCH resources based on the DCIs, and performs soft combining of the repetition data to obtain data (e.g., URLLC data) with improved reliability.

Figure 10:
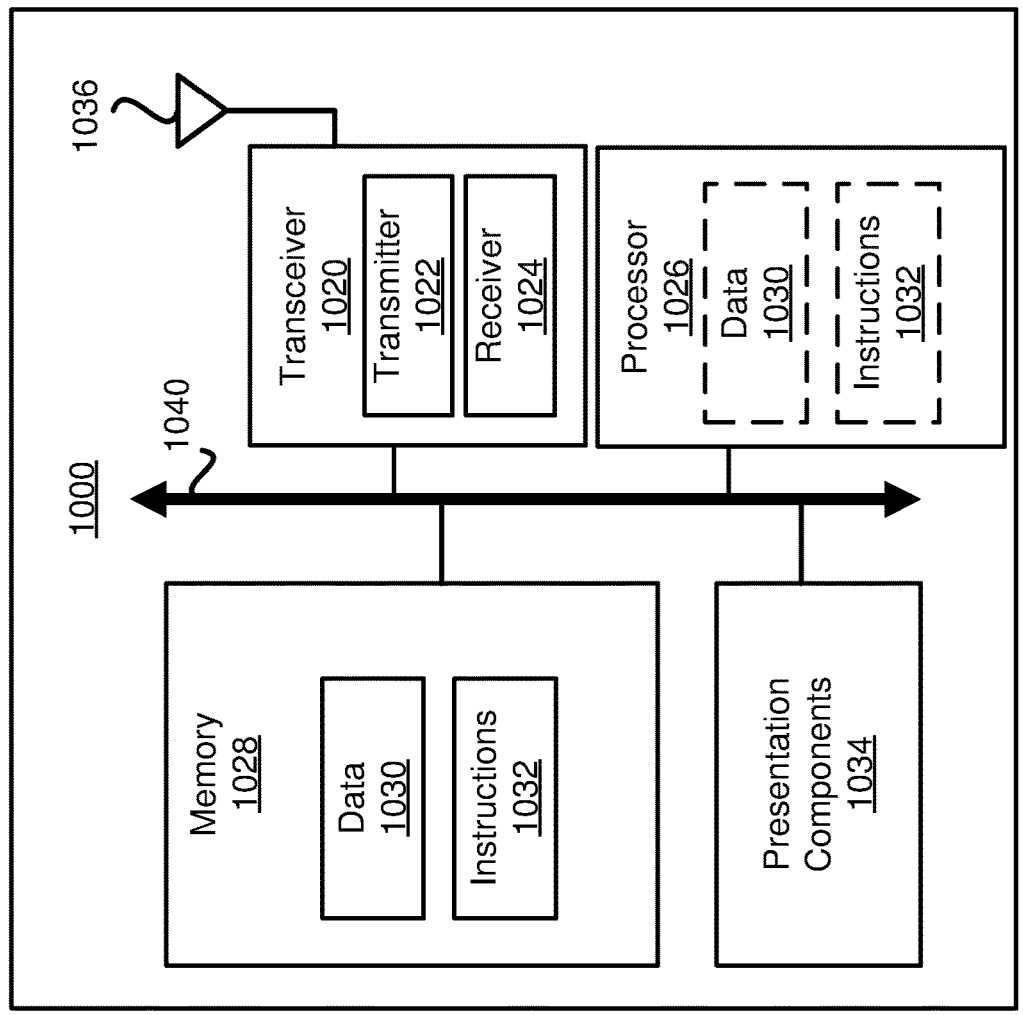
FIG. 10 is a block diagram illustrating a radio communication equipment, in accordance with an example implementation of the present application.

FIG. 10 illustrates a block diagram of a node for wireless communication, in accordance with various aspects of the present application. As shown in FIG. 10, a node 1000 may include a transceiver 1020, a processor 1026, a memory 1028, one or more presentation components 1034, and at least one antenna 1036. The node 1000 may also include an RF spectrum band module, a base station communications module, a network communications module, and a system communications management module, input/output (I/O) ports, I/O components, and power supply (not explicitly shown in FIG. 10). Each of these components may be in communication with each other, directly or indirectly, over one or more buses 1040. In one implementation, the node 1000 may be a UE or a base station that performs various functions described herein, for example, with reference to FIGS. 1 through 9C.

The transceiver 1020 having a transmitter 1022 and a receiver 1024 may be configured to transmit and/or receive time and/or frequency resource partitioning information. In some implementations, the transceiver 1020 may be configured to transmit in different types of subframes and slots including, but not limited to, usable, non-usable and flexibly usable subframes and slot formats. The transceiver 1020 may be configured to receive data and control channels.

The node 1000 may include a variety of computer-readable media. Computer-readable media can be any available media that can be accessed by the node 1000 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1028 may include computer-storage media in the form of volatile and/or non-volatile memory. The memory 1028 may be removable, non-removable, or a combination thereof. Exemplary memory includes solid-state memory, hard drives, optical-disc drives, and etc. As illustrated in FIG. 10, The memory 1028 may store computer-readable, computer-executable instructions 1032 (e.g., software codes) that are configured to, when executed, cause the processor 1026 to perform various functions described herein, for example, with reference to FIGS. 1 through 9C. Alternatively, the instructions 1032 may not be directly executable by the processor 1026 but be configured to cause the node 1000 (e.g., when compiled and executed) to perform various functions described herein.

The processor 1026 may include an intelligent hardware device, e.g., a central processing unit (CPU), a microcontroller, an ASIC, and etc. The processor 1026 may include memory. The processor 1026 may process the data 1030 and the instructions 1032 received from the memory 1028, and information through the transceiver 1020, the base band communications module, and/or the network communications module. The processor 1026 may also process information to be sent to the transceiver 1020 for transmission through the antenna 1036, to the network communications module for transmission to a core network.

One or more presentation components 1034 presents data indications to a person or other device. Exemplary presentation components 1034 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method comprising:
   receiving, by a user equipment (UE), first downlink control information (DCI) in a first control resource set (CORESET), the first DCI providing a first scheduling information for transmission of first data over a first physical downlink shared channel (PDSCH);
   receiving, by the UE, second DCI in a second CORESET, the second DCI providing a second scheduling information for transmission of second data, which is the same as the first data, over a second PDSCH; and
   receiving, by the UE, the first data over the first PDSCH and the second data over the second PDSCH using, respectively, the first and second scheduling information, wherein the first and second CORESETs are received using at least one of different time resources, different frequency resources, and different beams.

2. The method of claim 1, wherein receiving the first DCI comprises receiving the first DCI over a first physical downlink control channel (PDCCH), and wherein receiving the second DCI comprises receiving the second DCI over a second PDCCH.

3. The method of claim 1, wherein the first CORESET and the second CORESET each includes a decoding order for decoding the respective first DCI and second DCI.

4. The method of claim 1, wherein the UE refers to at least one of a time reference signal or a frequency reference signal associated with the second data to decode the first data.

5. The method of claim 1, further comprising soft combining the first data and the second data by the UE.

6. The method of claim 1, further comprising:
   ignoring, by the UE, the second DCI; and
   decoding, by the UE, the second data over the second PDSCH using the first DCI.

7. The method of claim 1, wherein:
   the first DCI includes at least one of: a first redundancy version information element, a first new data indicator information element, a first hybrid automatic repeat request (HARQ) process number, and a first new data indicator (NDI);
   the second DCI includes at least one of: a second redundancy version information element, a second new data indicator information element, a second HARQ process number, and a second NDI; and
   wherein at least one of:
      the first and second redundancy version information elements are the same;
      the first and second new data indicator information elements are the same;
      the first and second HARQ process number are the same; and
      the first and second NDIs are the same.

8. The method of claim 1, further comprising:
   receiving, by the UE, third DCI in a third CORESET, the third DCI providing scheduling information for transmission of the first data over the first PDSCH.

9. The method of claim 8, wherein receiving the third DCI comprises receiving the third DCI over a third PDCCH.

10. The method of claim 9, wherein at least one of:
    the first PDCCH and the second PDCCH are repetition PDCCHs;
    the first PDCCH and the third PDCCH are repetition PDCCHs; and
    the second PDCCH and the third PDCCH are repetition PDCCHs.

11. The method of claim 8, wherein the first DCI and the third DCI have at least one of different coding rates and different aggregation levels.

12. The method of claim 8, further comprising:
    soft combining, by the UE, the first DCI and the third DCI to form a combined DCI for obtaining the first scheduling information for transmission of the first data.

13. The method of claim 8, further comprising:
    ignoring, by the UE, the first DCI; and
    decoding, by the UE, the first data over the first PDSCH using the third DCI.

14. A user equipment (UE) comprising:
    one or more non-transitory computer-readable media having computer-executable instructions embodied thereon;
    at least one processor coupled to the one or more non-transitory computer-readable media, and configured to execute the computer-executable instructions to:
       receive first downlink control information (DCI) in a first control resource set (CORESET), the first DCI providing a first scheduling information for transmission of first data over a first physical downlink shared channel (PDSCH);
       receive second DCI in a second CORESET, the second DCI providing a second scheduling information for transmission of second data, which is the same as the first data, over a second PDSCH; and
       receive the first data over the first PDSCH and the second data over the second PDSCH using, respectively, the first and second scheduling information, wherein the first and second
    CORESETs are received using at least one of different time resources, different frequency resources, and different beams.

15. The UE of claim 14, wherein the first DCI is received by the UE over a first physical downlink control channel (PDCCH), and the second DCI is received by the UE over a second PDCCH.

16. The UE of claim 14, wherein the first CORESET and the second CORESET each includes a decoding order for decoding the respective first DCI and second DCI.

17. The UE of claim 14, wherein the UE refers to at least one of a time reference signal or a frequency reference signal associated with the second data to decode the first data.

18. The UE of claim 14, wherein the first data is encoded using a first modulation scheme based on the first DCI, and the second data is encoded using a second modulation scheme based on the second DCI.

19. The UE of claim 14, wherein the at least one processor is further configured to execute the computer-executable instructions to:

ignore the second DCI; and decode the second data over the second PDSCH using the first DCI.

20. The UE of claim 14, wherein:

the first DCI includes at least one of: a first redundancy version information element, a first new data indicator information element, a first hybrid automatic repeat request (HARQ) process number, and first new data indicator (NDI);

the second DCI includes at least one of: a second redundancy version information element, a second new data indicator information element, a second HARQ process number, and a second NDI; and wherein at least one of:

the first and second redundancy version information elements are the same;

the first and second new data indicator information elements are the same;

the first and second HARQ process number are the same; and the first and second NDIs are the same.

21. The UE of claim 14, wherein the at least one processor is further configured to execute the computer-executable instructions to:

receive third DCI in a third CORESET, the third DCI providing scheduling information for transmission of the first data over the first PDSCH.

22. The UE of claim 21, wherein the third DCI is received by the UE over a third PDCCH.

23. The UE of claim 22, wherein at least one of:

the first PDCCH and the second PDCCH are repetition PDCCHs;

the first PDCCH and the third PDCCH are repetition PDCCHs; and the second PDCCH and the third PDCCH are repetition PDCCHs.

24. The UE of claim 21, wherein the first DCI and the third DCI have at least one of different coding rates and different aggregation levels.

25. The UE of claim 21, wherein the at least one processor is further configured to execute the computer-executable instructions to:

soft combine the first DCI and the third DCI to form a combined DCI for obtaining the first scheduling information for transmission of the first data.

26. The UE of claim 21, wherein the at least one processor is further configured to execute the computer-executable instructions to:

ignore the first DCI; and decode the first data over the first PDSCH using the third DCI.

* * * * *